United States Patent
Rigas (10) Patent No.: US 9,789,453 B2
(45) Date of Patent: Oct. 17, 2017

(54) PIVOTING BLENDER

(71) Applicant: Peter Rigas, Yardley, PA (US)

(72) Inventor: Peter Rigas, Yardley, PA (US)

(73) Assignee: Tomzi International Ltd, Yardley, PA (US)

( * ) Notice: Subject to any disclaimer, the term of this patent is extended or adjusted under 35 U.S.C. 154(b) by 0 days.

(21) Appl. No.: 15/349,042

(22) Filed: Nov. 11, 2016

(65) Prior Publication Data

US 2017/0128896 A1    May 11, 2017

Related U.S. Application Data (60) Provisional application No. 62/253,695, filed on Nov. 11, 2015.

(51) Int. Cl.
| | |
|---|---|
| *B01F 7/16* | (2006.01) |
| *B01F 15/00* | (2006.01) |
| *A47J 43/046* | (2006.01) |
| *A47J 43/08* | (2006.01) |
| *B01F 7/00* | (2006.01) |
| *A47J 43/07* | (2006.01) |
| *B01F 15/02* | (2006.01) |

(52) U.S. Cl.
CPC ......... *B01F 7/00933* (2013.01); *A47J 43/046* (2013.01); *A47J 43/0716* (2013.01); *A47J 43/085* (2013.01); *B01F 7/00966* (2013.01); *B01F 7/162* (2013.01); *B01F 15/0295* (2013.01); *B01F 2015/00597* (2013.01); *B01F 2215/0026* (2013.01)

(58) Field of Classification Search
CPC ...... A47J 43/046; A47J 43/0716; A47J 36/34; A47J 43/0722; A47J 43/085; B01F 7/162; B01F 2015/00597; B01F 15/0295; B01F 13/0098; B01F 2009/0063; B01F 2215/0026; B01F 7/00933; B01F 7/00966; B01F 13/0033
See application file for complete search history.

(56) References Cited

U.S. PATENT DOCUMENTS

| | | | | |
|---|---|---|---|---|
| 1,809,363 | A * | 6/1931 | Teare | A47J 43/046 241/100 |
| 2,041,318 | A * | 5/1936 | Berger | A47J 37/047 219/389 |
| 2,246,054 | A * | 6/1941 | Marty | A47J 43/046 241/277 |
| 2,511,357 | A * | 6/1950 | Marty | A47J 43/044 209/251 |
| 2,894,551 | A * | 7/1959 | Fritz | B01F 7/162 241/199.12 |
| 2,918,956 | A * | 12/1959 | Fritz | B02C 18/08 241/199.9 |
| 3,208,593 | A * | 9/1965 | Dietert | B07B 1/22 209/288 |
| 3,434,518 | A * | 3/1969 | Motis | A47J 42/56 241/199.12 |
| 3,700,176 | A * | 10/1972 | Haber | B01F 7/162 241/199.7 |

(Continued)

*Primary Examiner* — Tony G Soohoo
(74) *Attorney, Agent, or Firm* — Joseph E. Maenner; Maenner & Associates, LLC (57) ABSTRACT

A blender assembly includes a base and a blender assembly pivotally mounted on the base such that the blender pivots in only a single plane.

12 Claims, 14 Drawing Sheets

(56) References Cited

U.S. PATENT DOCUMENTS

| | | | | |
|---|---|---|---|---|
| 4,048,473 | A | * | 9/1977 | Burkhart ............... A47J 37/047 219/389 |
| 4,106,118 | A | * | 8/1978 | Hoover ................. B01F 7/162 241/97 |
| 4,173,925 | A | * | 11/1979 | Leon ..................... A47J 27/14 219/389 |
| 4,212,546 | A | * | 7/1980 | Porteous ............. B01F 13/0016 241/169.1 |
| 4,226,175 | A | * | 10/1980 | Sandor .................. A47J 31/42 99/286 |
| 4,278,386 | A | * | 7/1981 | Eranosian ............. B65G 65/24 248/142 |
| 4,301,717 | A | * | 11/1981 | Knees .................... A47J 27/14 366/185 |
| 4,450,758 | A | * | 5/1984 | Belinkoff ............. A47J 37/047 215/236 |
| 4,487,509 | A | | 12/1984 | Boyce |
| D285,404 | S | * | 9/1986 | Wang ......................... D7/377 |
| 4,863,278 | A | * | 9/1989 | Otto ..................... A47J 43/046 241/282.2 |
| 4,957,373 | A | | 9/1990 | Derksen et al. |
| 5,107,096 | A | * | 4/1992 | Knees .................. A47J 27/004 219/433 |
| 5,323,973 | A | | 6/1994 | Ferrara, Jr. |
| D366,182 | S | * | 1/1996 | Hsieh ............................. D7/376 |
| D384,548 | S | * | 10/1997 | Hsieh ............................. D7/376 |
| 5,938,330 | A | | 8/1999 | Robinson et al. |
| D414,785 | S | * | 10/1999 | Norris ............................. D15/82 |
| 6,145,432 | A | * | 11/2000 | Bellue, Jr. ............. A23B 4/005 366/139 |
| 6,374,727 | B1 | * | 4/2002 | Cretors .................. A23L 7/187 366/185 |
| 6,595,680 | B2 | * | 7/2003 | Sanpei .................... A47J 43/04 366/147 |
| 6,632,013 | B2 | | 10/2003 | Wulf et al. |
| 7,267,478 | B2 | | 9/2007 | Miller et al. |
| 7,413,102 | B1 | * | 8/2008 | Borchardt ................ B65G 7/12 126/349 |
| 7,717,613 | B1 | * | 5/2010 | Epps ..................... A47J 43/042 366/205 |
| 7,901,721 | B2 | * | 3/2011 | Oosterling ........... A47J 37/047 426/466 |
| 7,993,054 | B2 | | 8/2011 | Wulf et al. |
| 8,122,815 | B2 | * | 2/2012 | Wolfe .................. A47J 36/165 219/389 |
| 8,469,586 | B2 | | 6/2013 | Schleinzer |
| 2016/0367073 | A1 | * | 12/2016 | Smith ..................... A47J 36/00 |

* cited by examiner

PIVOTING BLENDER

CROSS-REFERENCE TO RELATED APPLICATION

The present application claims priority from U.S. Provisional Patent Application Ser. No. 62/253,695, filed on Nov. 11, 2015, which is incorporated by reference herein in its entirety.

BACKGROUND OF THE INVENTION

Field of the Invention

The present invention relates to a blender for food processing, and, in particular, to a blender that pivots relative to a mount to assist in processing food inside a blender.

Description of the Related Art

Blenders are often used in both home and industrial kitchens to process food. Occasionally, however, food particles attach to the side walls of the blender or get stuck underneath the blender's cutting blades and, as a result, the food may not be properly blended. Presently, in order to properly blend this food, the blender must be turned off, its lid removed, and a spatula or other utensil must be inserted into the blender to manually scrape this food off the blender wall and away from the blades. This process is time consuming and presents the possibility of contaminating the food if the utensil is dirty.

It would be beneficial to provide a blender that can knock loose the unblended food for ultimate blending without having to stop the blender or insert a utensil into the blender to stir the food.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention provides a blender assembly that includes a motor mount pivotally mounted on a base, such that the motor mount is only pivotable in a front-to-back direction.

In an alternative embodiment, the present invention provides a blender assembly that includes a motor mount pivotally mounted on a base, such that the motor mount is pivotable in a 360° motion.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION OF THE PRESENT INVENTION

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Referring to FIGS. 1-6, a blender assembly 100 according to a first exemplary embodiment of the present invention is shown. Blender assembly 100 includes a pivoting mechanism that allows the user to rock the blending portion of blender assembly 100 in a front-to-back direction and to forcefully engage the blending portion with a hard stop to knock loose any food particles that may be attached to the sidewalls of the blender container.

Figure 1:
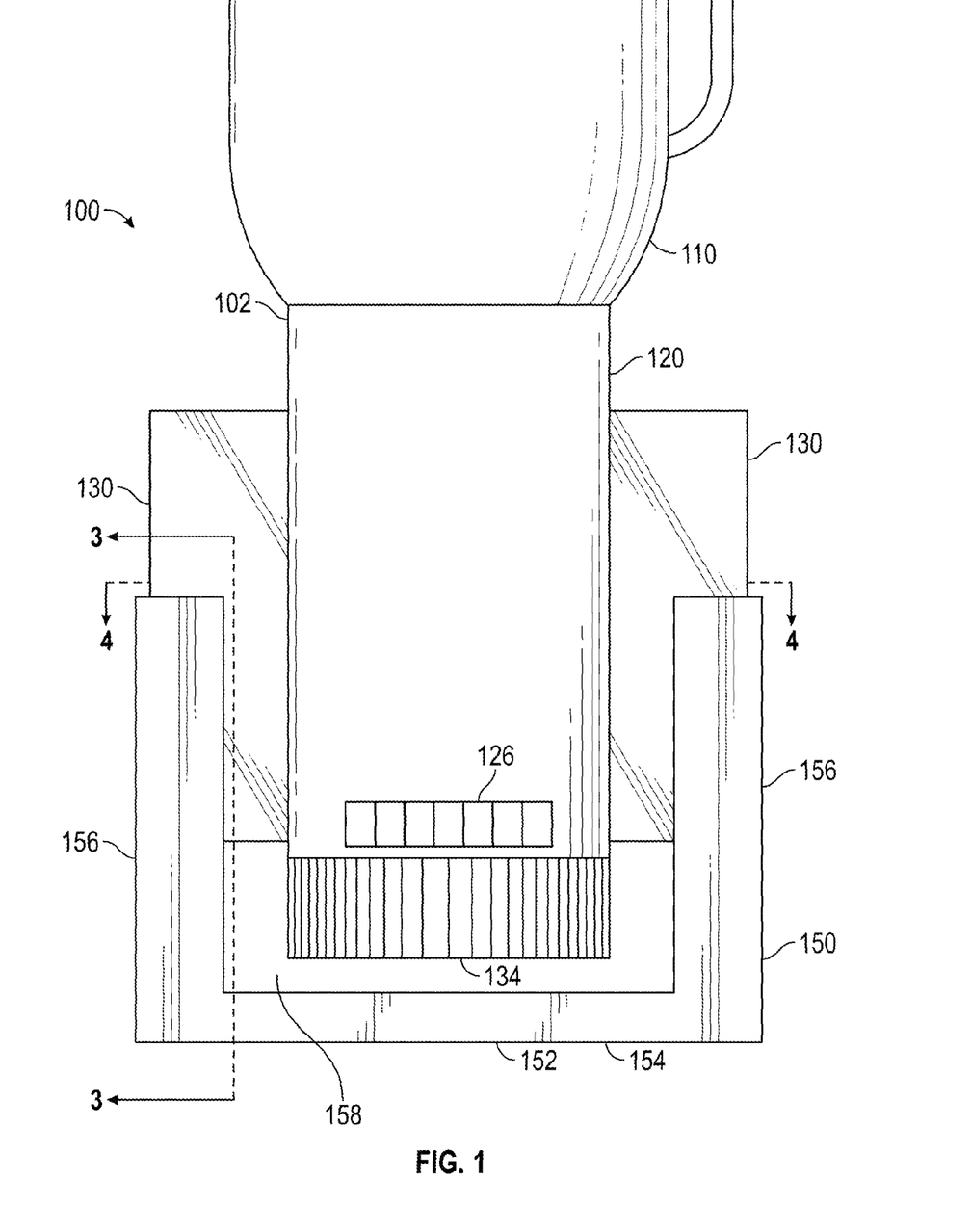
FIG. 1 shows a front elevational view of a blender assembly mounted on a pivot stand according to a first exemplary embodiment of the present invention.

Blender assembly 100 includes a blending portion 102 that includes a blender container 110 releasably mountable onto a pivoting blender motor assembly 120. Blender container 110 can be any known blender that is used to process food inserted therein and is not necessarily the scope of the present invention, and need not be described in detail.

Pivoting blender motor assembly 120 is pivotally mounted onto a pivot base 150 such that blender motor assembly 120 pivots in only a single plane, such as for example, in a front-to-back direction. The pivoting is performed by hand, in the absence of any motors, gears, or other mechanical or electromechanical devices to physically pivot blender motor assembly 120 with respect to pivot base 150.

Pivot base 150 can be mounted on a flat surface, such as, for example, a tabletop. In a commercial environment, pivot base 150 can be fixedly mounted to the flat surface, although those skilled in the art will recognize that pivot base 150 can be removably placed on the flat surface.

Figure 2:
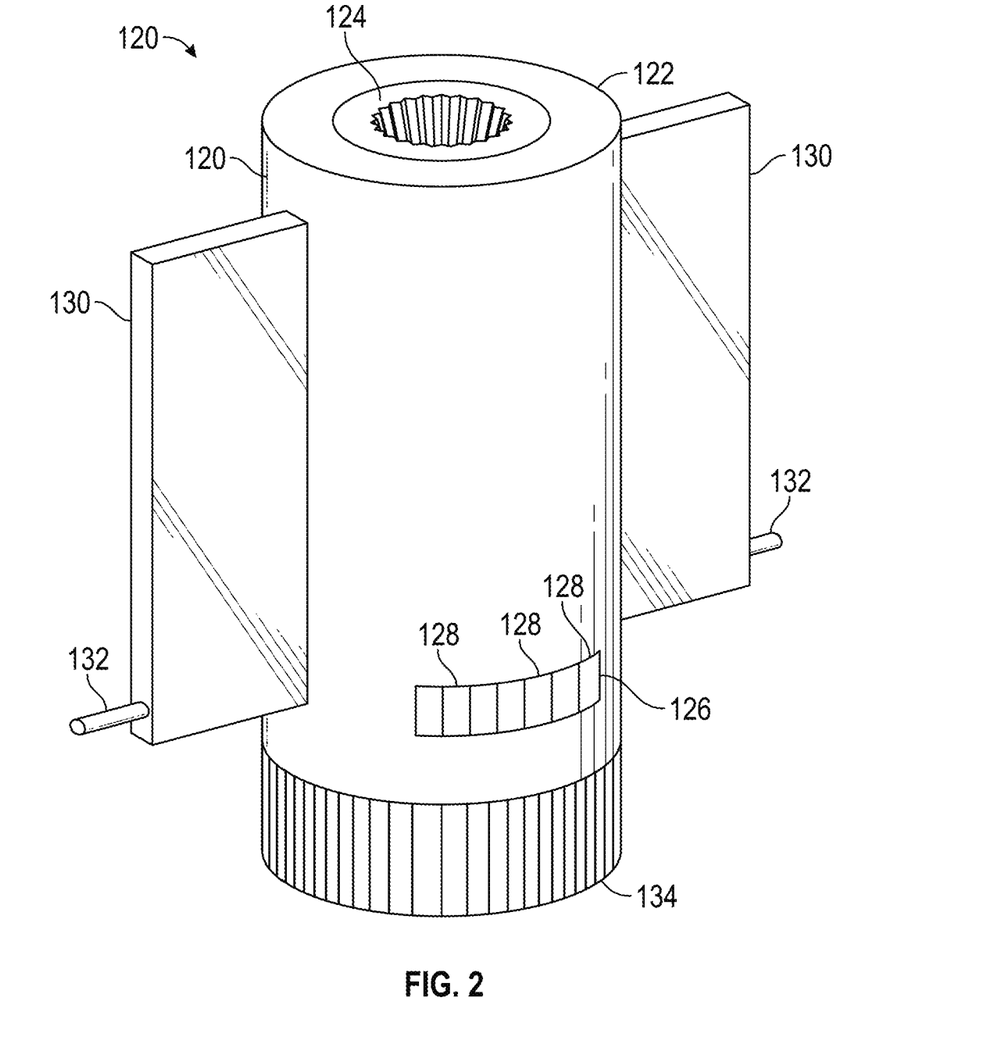
FIG. 2 is a perspective view of a pivoting motor mount used in the blender assembly shown in FIG. 1.

Referring to FIG. 2, blender motor assembly 120 includes a housing 122 that contains a motor (not shown) for operating blender assembly 100. The motor is operatively coupled to a rotating clutch 124 that engages with a rotating clutch (not shown) on the bottom of blender container 110 in order to rotate a blade (not shown) inside blender container 110. A motor control button panel 126 is mounted on housing 122 and contains a plurality of buttons 128 that are used to control the motor.

Blender motor assembly 120 also includes a pair of side flanges 130 that extend outwardly from housing 122. Side flanges 130 are generally elongate parallelepiped members that extend diametrically opposite from each other. Side flanges 130 are used to engage with pivot base 150 in order to effect a desired "banging" of blender motor assembly 120 against pivot base 150 in order to knock food loose that may be stuck to the side wall of blender container 110. A pivot pin 132 extends outwardly from the base of each flange 130. Pivot pins 132 are axially aligned and each pivot pin 132 extends into pivot base 150, allowing blender motor assembly 120 to pivot relative to pivot base 150.

Bottom portion 134 of blender motor assembly 120 can be weighted such that the center of gravity of blender motor assembly 120 is at or below the vertical height of pivot pins 132, such that, in an unbiased position, blender motor assembly 120 extends generally in a vertical position, with bottom portion 134, being located vertically below rotating clutch 124. The motor (not shown) can be located toward bottom portion 134 to assist in providing the desired weight.

In an alternative embodiment, bottom portion 134 of blender motor assembly 120 can be weighted such that, in addition to the center of gravity of blender motor assembly 120 being at or below the vertical height of pivot pins 132, the center of gravity is located forward of pivot pins 132, toward motor control button panel 126, such that, in an unbiased position, blender motor assembly 120 is pivoted such that blender container 110 is angled toward the user, enabling the user to look into blender container 110 without having to lean over blender assembly 100.

Figure 3:
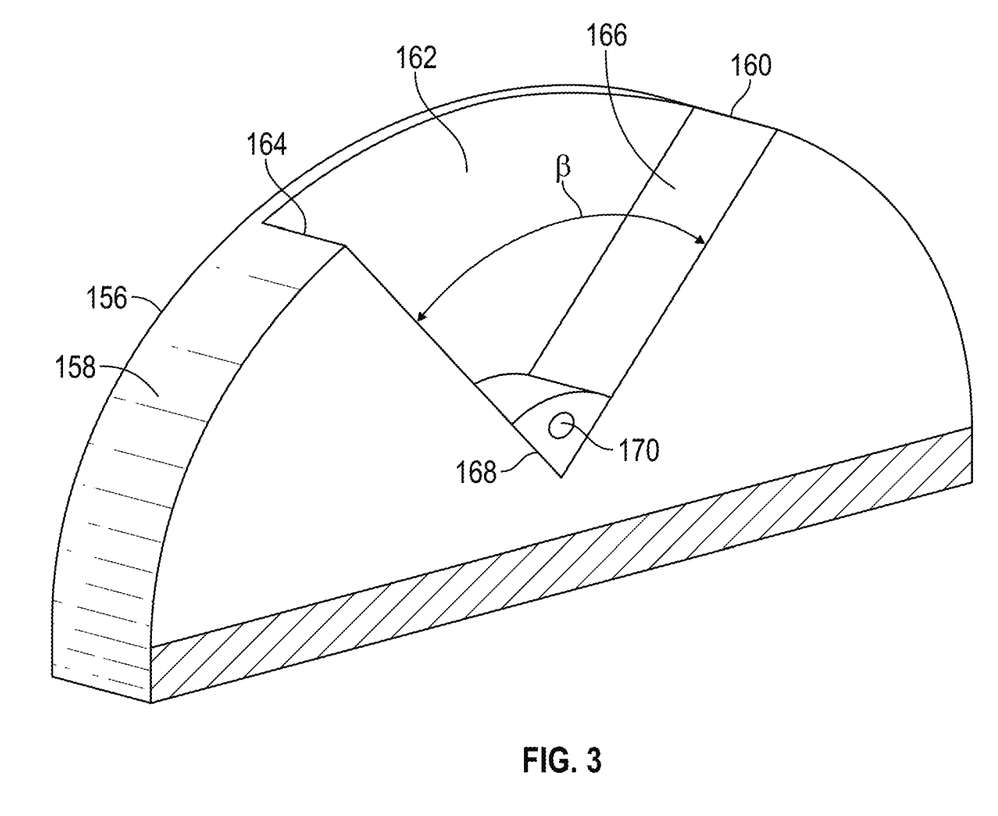
FIG. 3 is a side elevational view of a motor mount, partially in section, of the pivot stand, taken along lines 3-3 of FIG. 1.
Figure 4:
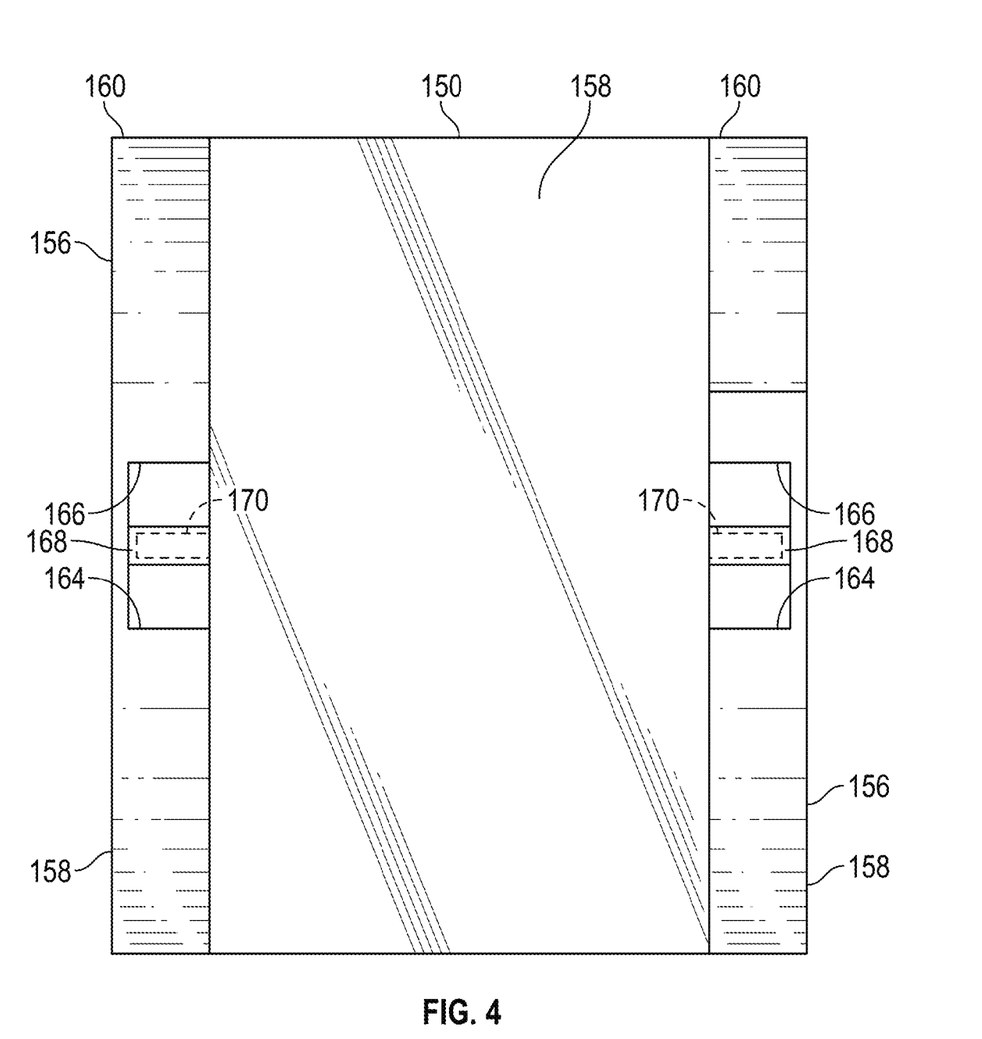
FIG. 4 is a top plan view of the motor mount used in the blender assembly shown in FIG. 1.
Figure 5:
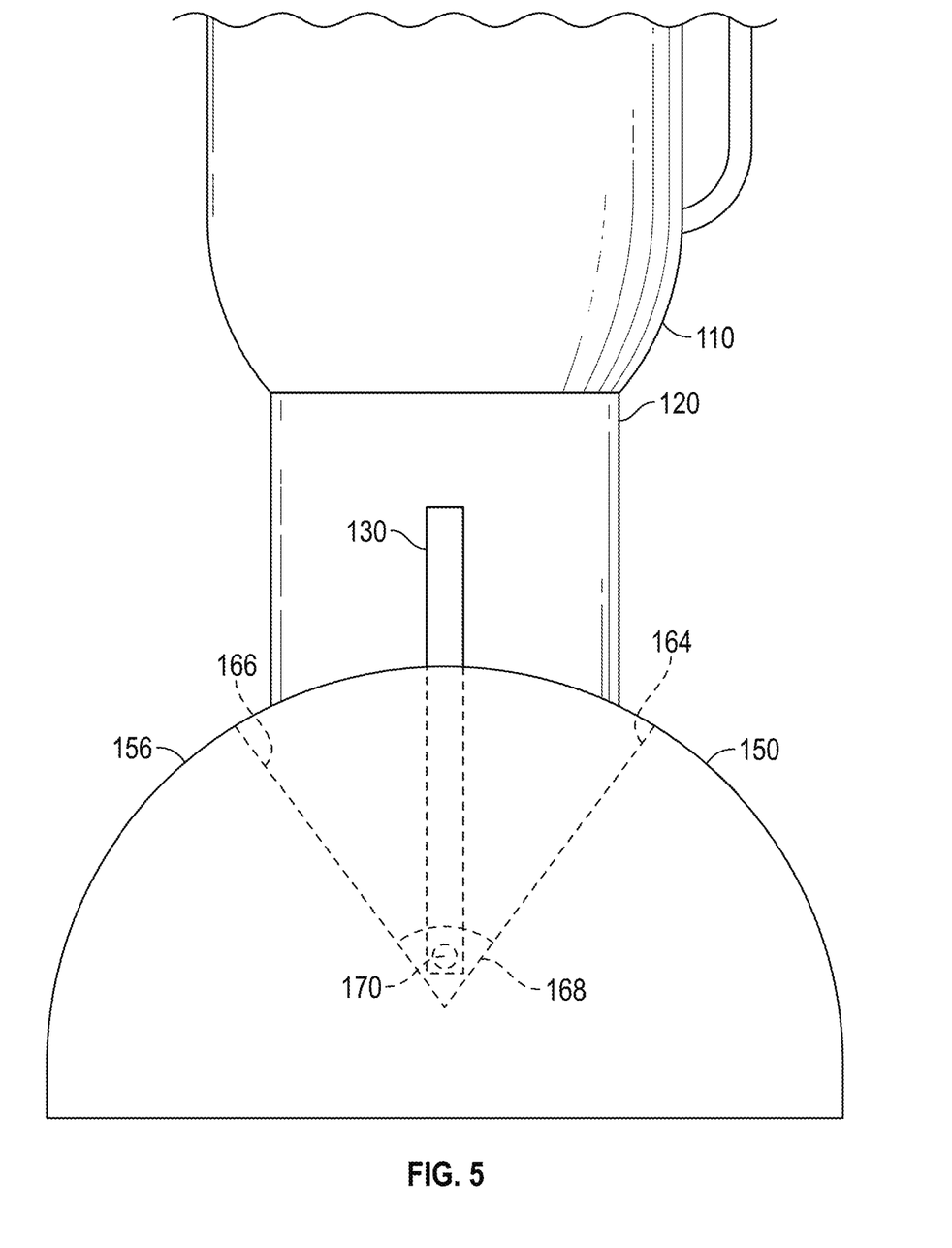
FIG. 5 is a side elevational view of the blender assembly shown in FIG. 1.

Referring to FIGS. 3 and 4, pivot base 150 is shown. Pivot base 150 has a generally U-shaped configuration, with a base portion 152 having a flat bottom surface 154 adapted to allow blender assembly 100 to sit on a flat, planar surface. A pair of generally parallel, upright extending sidewalls 156. Each extends upwardly from bottom surface 154. Space 158 between the two sidewalls 156 is sized to allow blender motor assembly 120 to freely fit therebetween.

As shown in FIG. 3, each sidewall 156 includes a front portion 158 and a rear portion 160, with a generally "V-shaped" notch 162 formed therebetween. Notch 162 is formed by a front stop 164 and a rear stop 166 that extend downward at an angle β relative to each other such that front stop 164 and rear stop 166 restrict the pivoting of blender motor assembly 120 with respect to base 150. Blender motor assembly 120 can pivot no more than about β/2 degrees from the vertical. In an exemplary embodiment, angle β can be about 45° and angle β/2 is about 22.5°, although those skilled in the art will recognize that angle β can be other angles as well.

A pivot mount 168 is located at the confluence of front stop 164, and 166 includes a pivot pin hole 170 into which a pivot pin 132 is inserted. With blender motor assembly 120 inserted into pivot base 150, as shown FIG. 1, each flange 130 is located within notch 162, with a top portion of flange 130 extending upwardly above its respective sidewall 156.

To operate blender assembly 100, blender container 110 is inserted onto clutch 124 on top of blender motor assembly 120. Food/liquid is added to blender container 110 and a lid (not shown) is placed over top of blender container 110. A user selects a desired button 128 on motor control button panel 126 to start the motor and blend the food within blender container 110.

Figure 6:
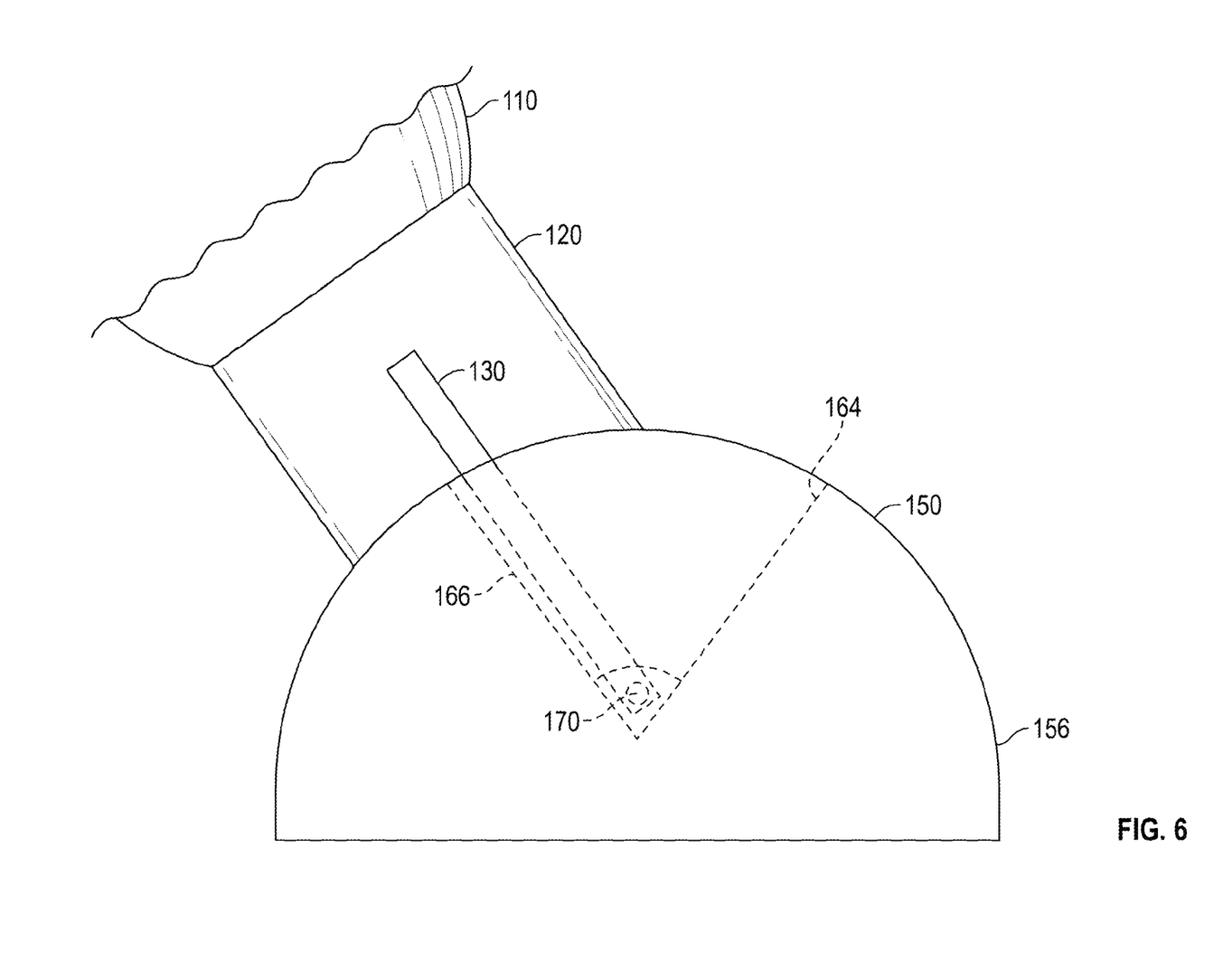
FIG. 6 is a side elevational view of the blender assembly shown in FIG. 1, with the blender pivoted in a backwards position.

As the food/liquid is being blended, the user grips at least one of the flanges 130 above sidewall 156 and rocks flange 130 back and forth in a forward-to-backward motion, alternatively banging flange against front stop 164, and rear stop 166 to dislodge any food product that may be stuck on the sidewall of blender container 110 or possibly wedged underneath the cutting blade within blender container 110. FIG. 6 shows blender container 110 with blender motor assembly 120 pivoted against rear stop 166.

When the food inside blender container 110 is sufficiently blended, the user stops rocking flange 130, and pushes a "Stop" button 128 on motor button control panel 126.

Figure 7:
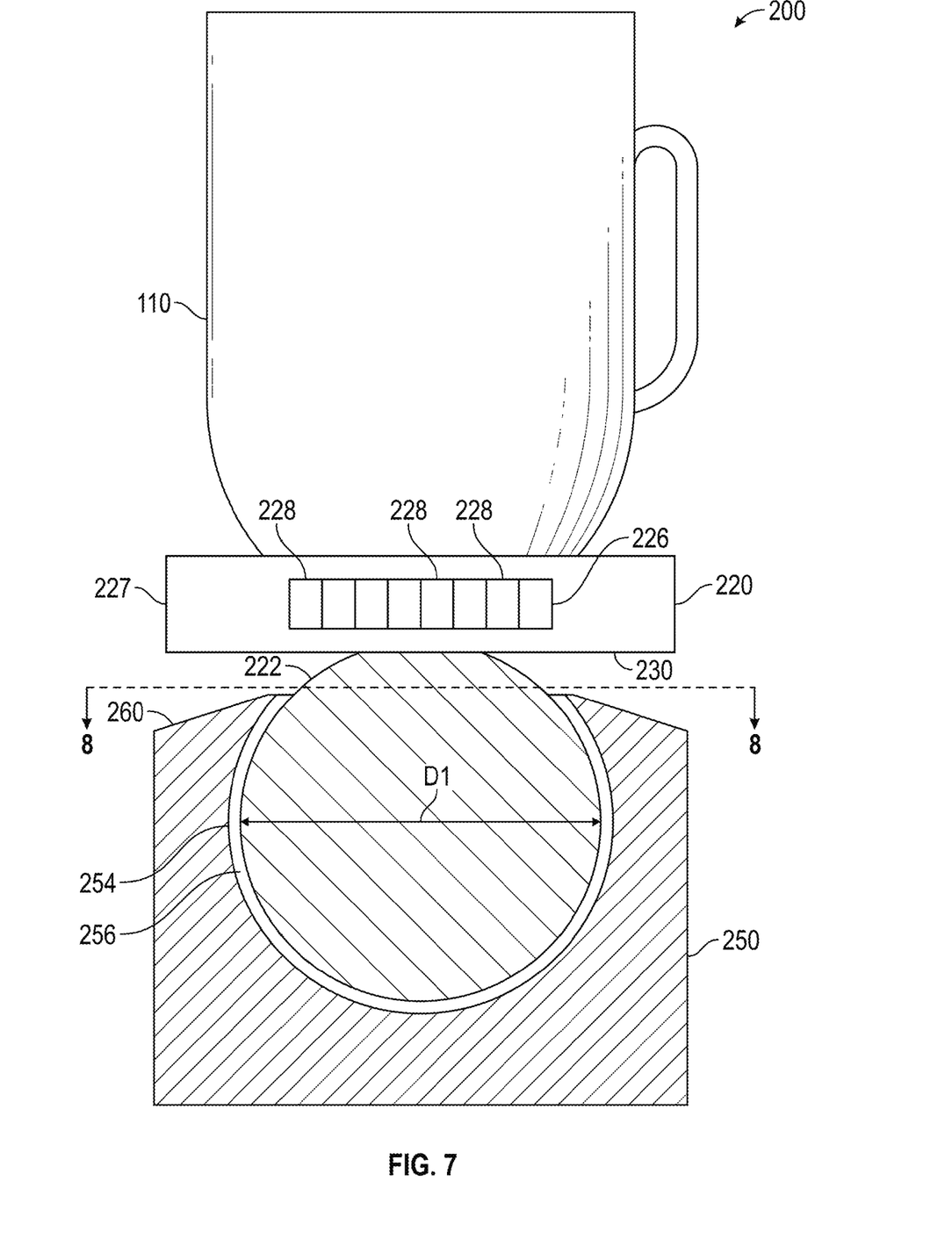
FIG. 7 shows a front elevational view, partially in section, of a blender assembly mounted on a pivot base according to a second exemplary embodiment of the present invention.
Figure 8:
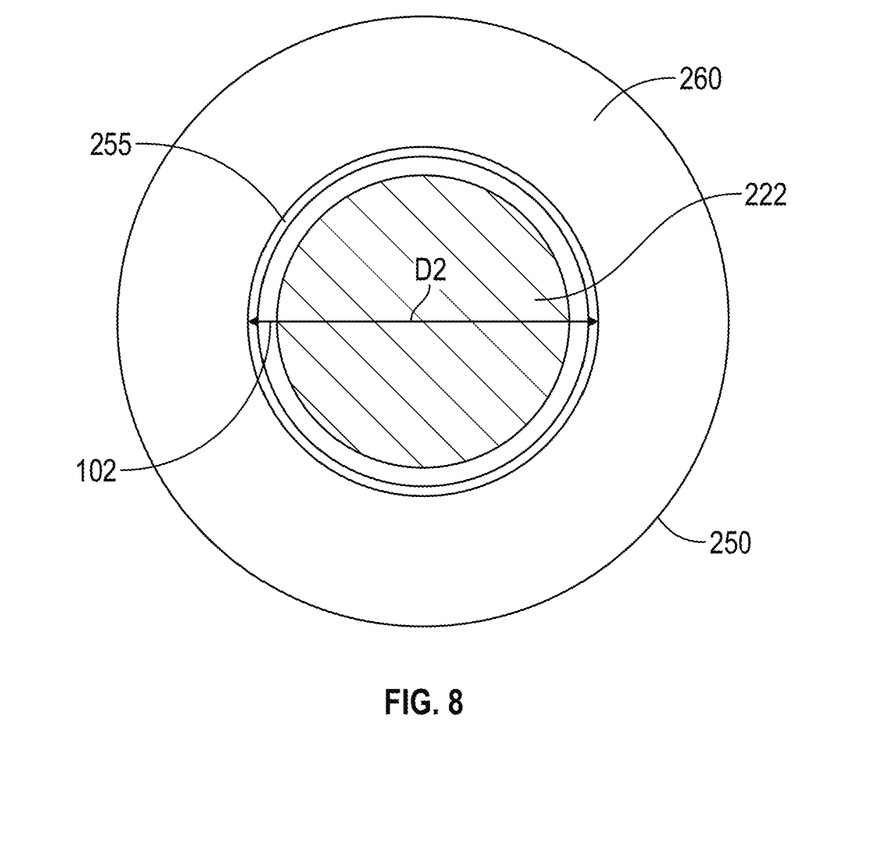
FIG. 8 shows a sectional view of the blender assembly shown in FIG. 7, taken along lines. 8-8 of FIG. 7.
Figure 9:
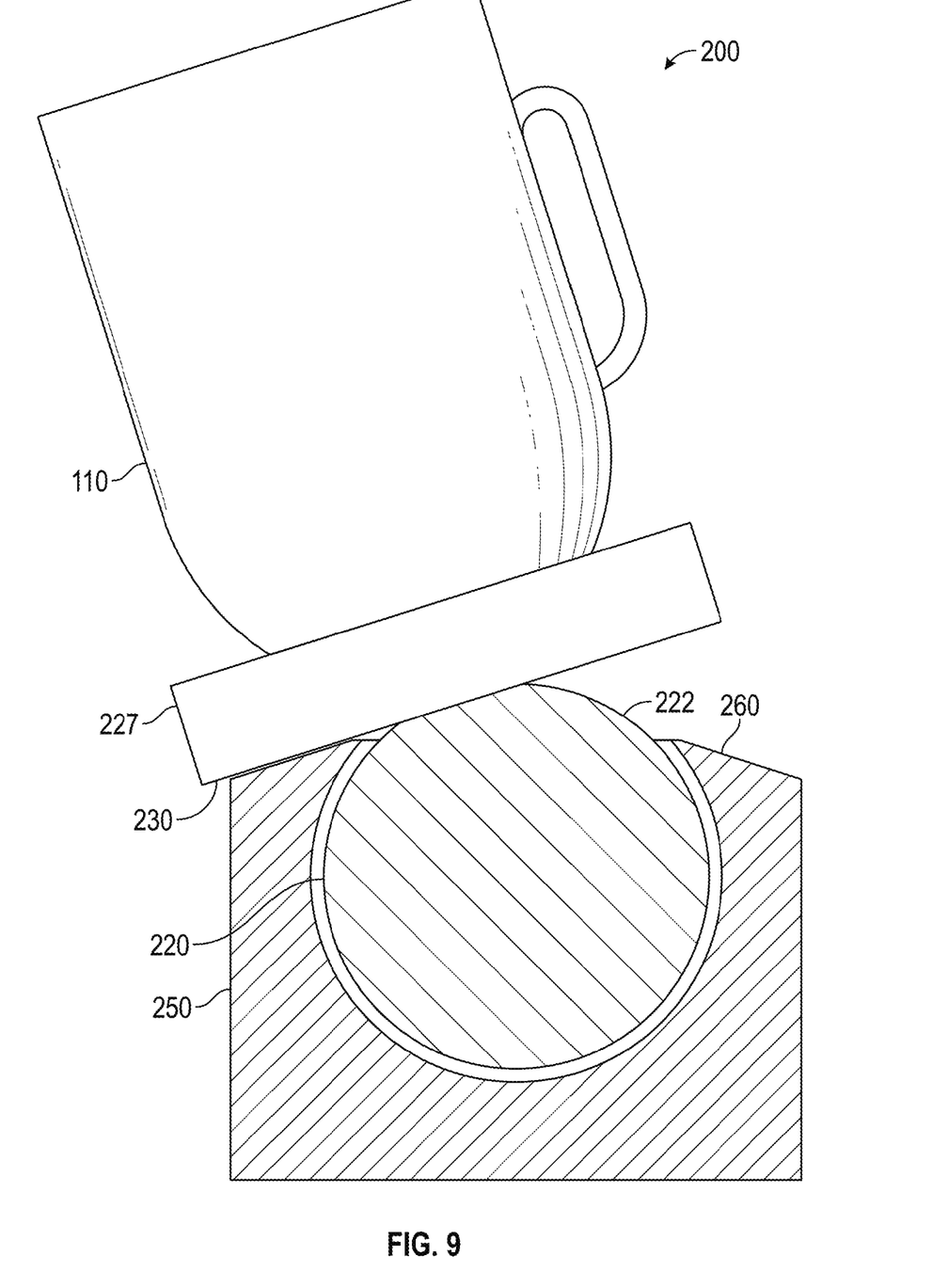
FIG. 9 shows a side elevational view, partially in section, of the blender assembly shown FIG. 7, with the blender pivoted in a backwards position.
Figure 10:
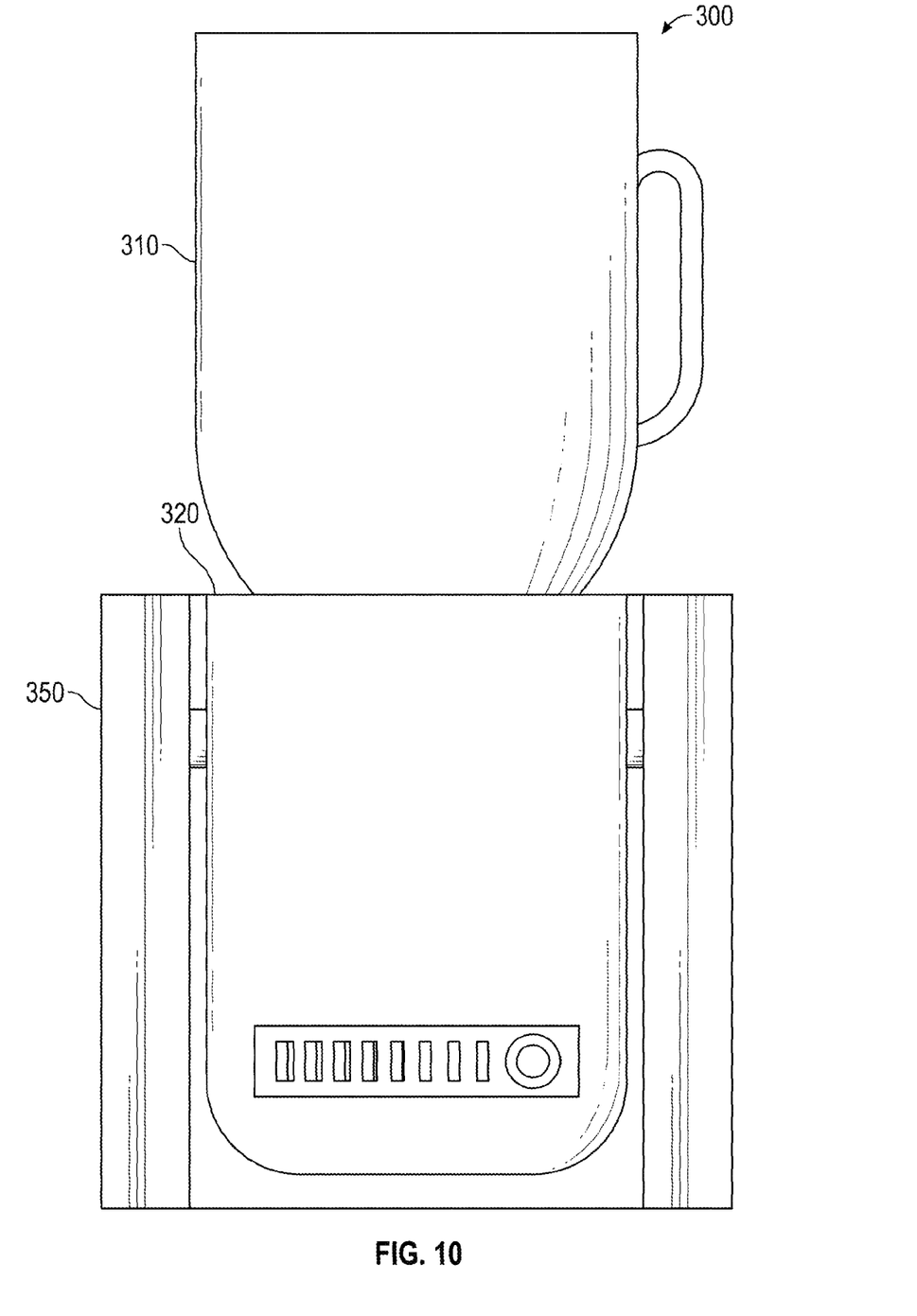
FIG. 10 is a front elevational view of a blender assembly mounted on a pivot base according to a third exemplary embodiment of the present invention.
Figure 11:
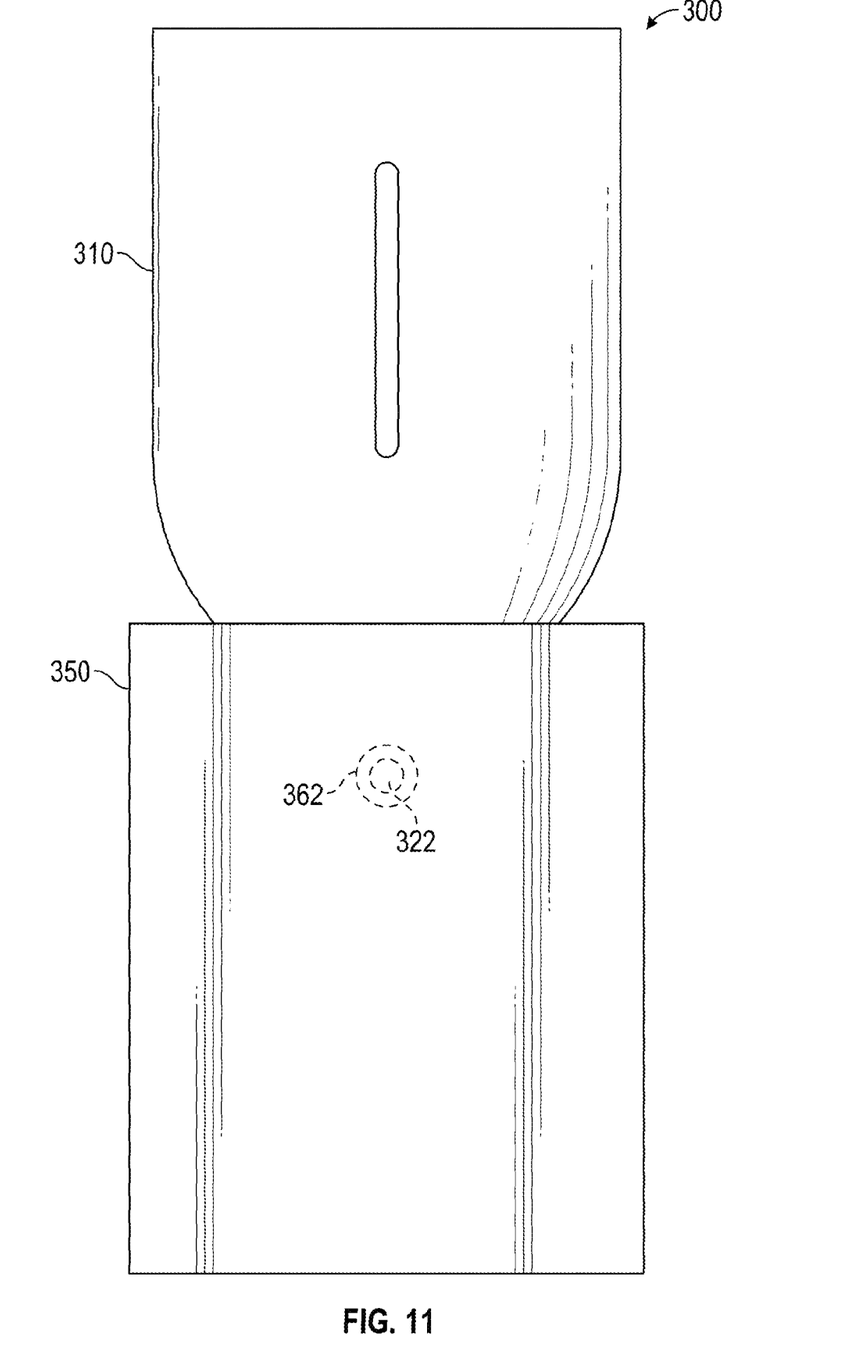
FIG. 11 is a side elevational view of the blender assembly shown in FIG. 10.

Referring to FIGS. 7-9, a blender assembly 200 according to a second exemplary embodiment of the present invention is shown. Blender assembly 200 includes a pivoting mechanism that allows the user to rock the blending portion of blender assembly 200 in infinite directions and to forcefully engage the blending portion with a hard stop to knock loose any food particles that may be attached to the sidewalls of the blender container.

Blender assembly 200 includes blending portion 102 that includes blender container 110 releasably mountable onto a pivoting blender motor assembly 220.

Pivoting blender motor assembly 220 is pivotally mounted onto a pivot base 250. Pivot base 250 can be mounted on a flat surface, such as, for example, a tabletop. In a commercial environment, pivot base 250 can be fixedly mounted to the flat surface, although those skilled in the art will recognize that pivot base 250 can be removably placed on the flat surface.

Referring to FIG. 7, blender motor assembly 220 includes a housing 222 that contains a motor (not shown) for operating blender assembly 200. A motor control button panel 226 is mounted on a platform 227, located directly above housing 222 and contains a plurality of buttons 228 that are used to control the motor. Housing 222 is generally ball-shaped and has a diameter D1, and can be constructed from and/or coated with a low-friction material, such as, for example, nylon. Platform 227 has a lower engagement surface 230 that engages a top surface 260 of pivot base 250 when blender motor assembly 220 is pivoted relative to pivot base 250.

Pivot base 250 includes a curved, concave pivot surface 254 that extends over an arc of greater than 180° and, preferably, greater than about 220°, forming an opening 255 having a diameter D2, which is smaller than D1 such that housing 222 cannot be removed from pivot base 250. Pivot surface 254 has diameter D1 sufficiently large to accommodate housing 222, yet allows housing 222 to rotate freely within a space 256 defined by pivot surface 254.

Similar to housing 222, pivot surface 254 can be constructed from and/or coated with a low friction material, such as, for example, nylon. The low friction surfaces of housing 222 and/or pivot surface 254 allow blender motor assembly 222 pivot freely along any orientation relative to pivot base 250.

A top surface 260 of pivot base 250 is beveled concentrically around its outer perimeter to provide a frustoconical top surface, thereby allowing blender container 110 to pivot with blender motor assembly 220 in any direction relative to the vertical, as shown FIG. 9.

Housing 222 of blender motor assembly 220 can be weighted such that the center of gravity of blender motor assembly 220 is at or below the geometric center of housing 222, such that, in an unbiased position, blender motor assembly 220 extends generally in a vertical position.

In operation, blender container 110 is inserted onto blender motor assembly 220. Food/liquid is added to blender container 110 and a lid (not shown) is placed over top of blender container 110. A user selects a desired button 228 on motor control button panel 226 to start the motor and blend the food within blender container 110.

Lower engagement surface 230 can be banged against pivot surface 254 in order to shake loose food particles that may be stuck inside blender 110. Alternatively, blender 110 and blender motor assembly 220 can be pivoted such that lower engagement surface 230 engages pivot surface 254 and then blender 110 can be rotated such that lower engagement surface 230 slides around the perimeter of pivot surface 254.

When the food inside blender container 110 is sufficiently blended, the user rotates blender and blender motor assembly 220 to a vertical position, and pushes a "Stop" button 228 on motor button control panel 226.

A third exemplary embodiment of a pivoting blender assembly 300 according to the present invention is shown in FIGS. 10-14. Blender assembly 300 includes a blender 310 releasably mounted on a blender motor assembly 320. Blender motor assembly 320 is pivotally mounted onto a pivot base 350 such that blender 310 and motor assembly 320 can pivot in only a single plane, in a front-to-back direction.

Figure 12:
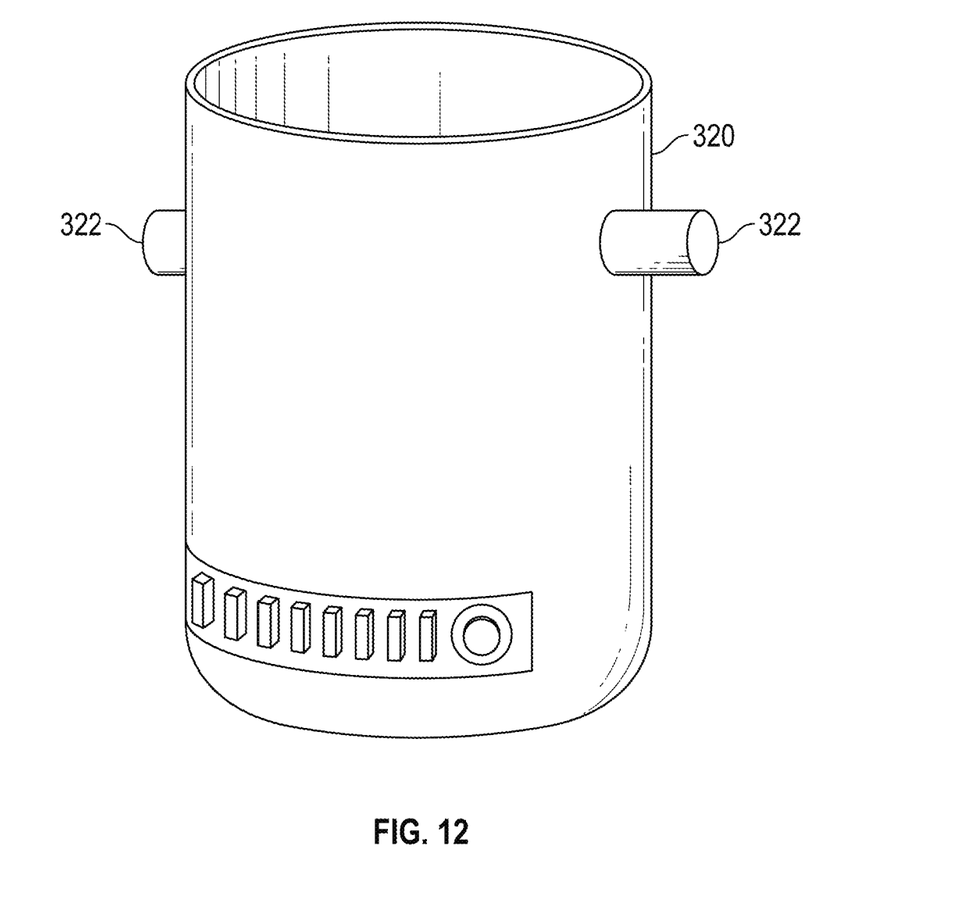
FIG. 12 is a perspective view of a blender motor for use with the blender assembly shown in FIG. 10.

Referring to FIG. 12, motor assembly 320 includes a pair of axially aligned pivot pins 322 that each extend outwardly from motor assembly 320. Each pivot pin 322 extends into pivot base 350, allowing blender motor assembly 320 to pivot relative to pivot base 350.

Figure 13:
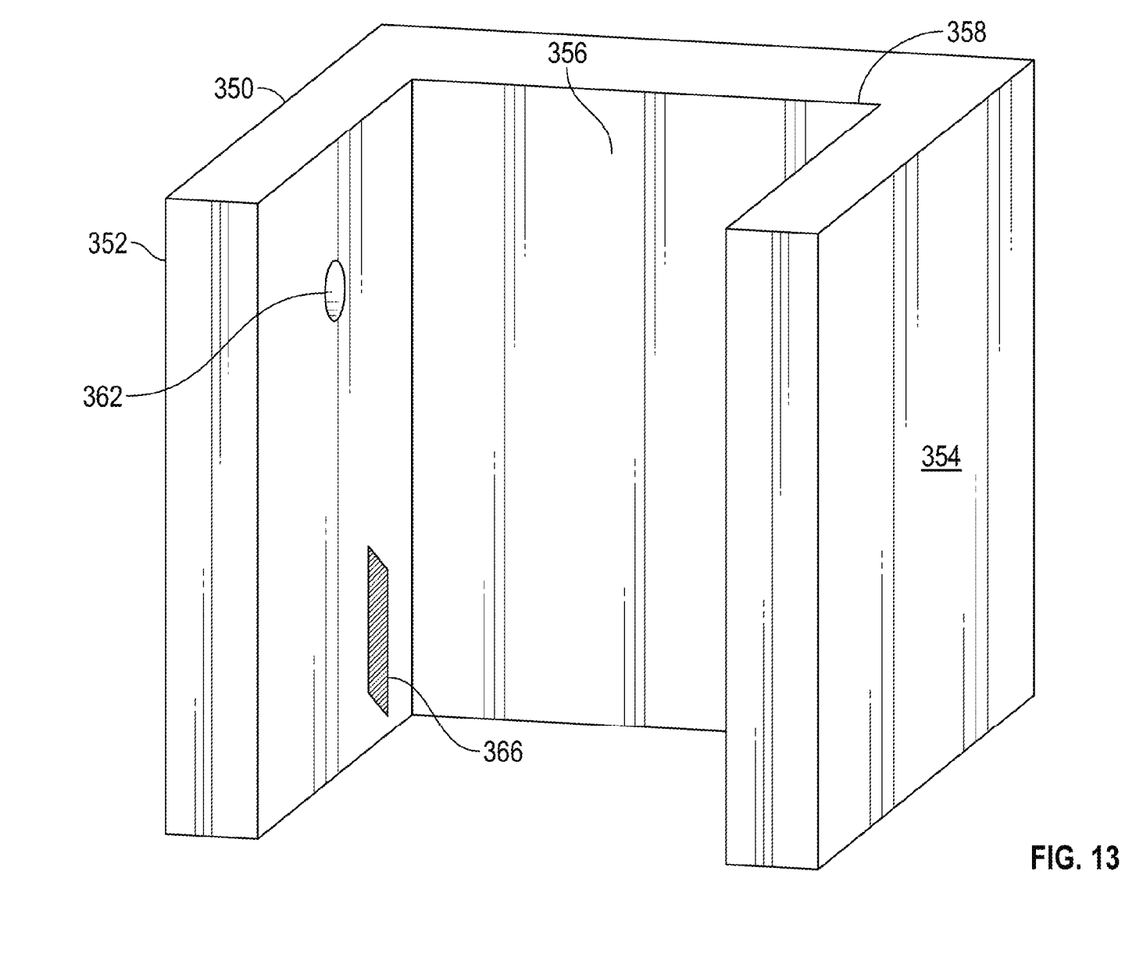
FIG. 13 is a perspective view of a pivot base for use with the blender assembly shown in FIG. 10.

Pivot base 350 is shown in FIG. 13. Pivot base 350 is generally U'shaped, with a left side wall 352, a right side wall 354, and a rear wall 356. Rear wall 356 includes an engagement surface 358. Engagement surface 358 is used to engage either blender 310 or motor assembly 320 during pivoting of blender 310 and motor assembly 320 and act as a stop. While engagement surface 358 is shown in FIG. 13 as an edge, those skilled in the art will recognize that engagement surface 358 can be beveled, similar to top surface 260 of pivot base 250, as described above.

A front of base 350 is open to allow motor assembly 320 to pivot. Each side wall 352, 354 includes a receiver 362, 364 respectively (receiver 362 shown in FIG. 11) that is aligned and sized to accept a pivot pin 322 so that motor assembly 320 can pivot on pivot base 350.

At least one flange 366 extends outwardly from one of side walls 352, 354 inwardly into pivot base 350. Flange 366 is located below receivers 362, 364 and is between receivers 362, 364 and rear wall 356 so that motor assembly 320 cannot be pivoted toward rear wall 356. Flange 366 acts as a stop to prevent pivoting motor assembly 320 in that direction. While a single flange 366 is shown extending from left side wall 352, those skilled in the art will recognize that flange 366 can extend from right side wall 354, or both side walls 352, 354.

Figure 14:
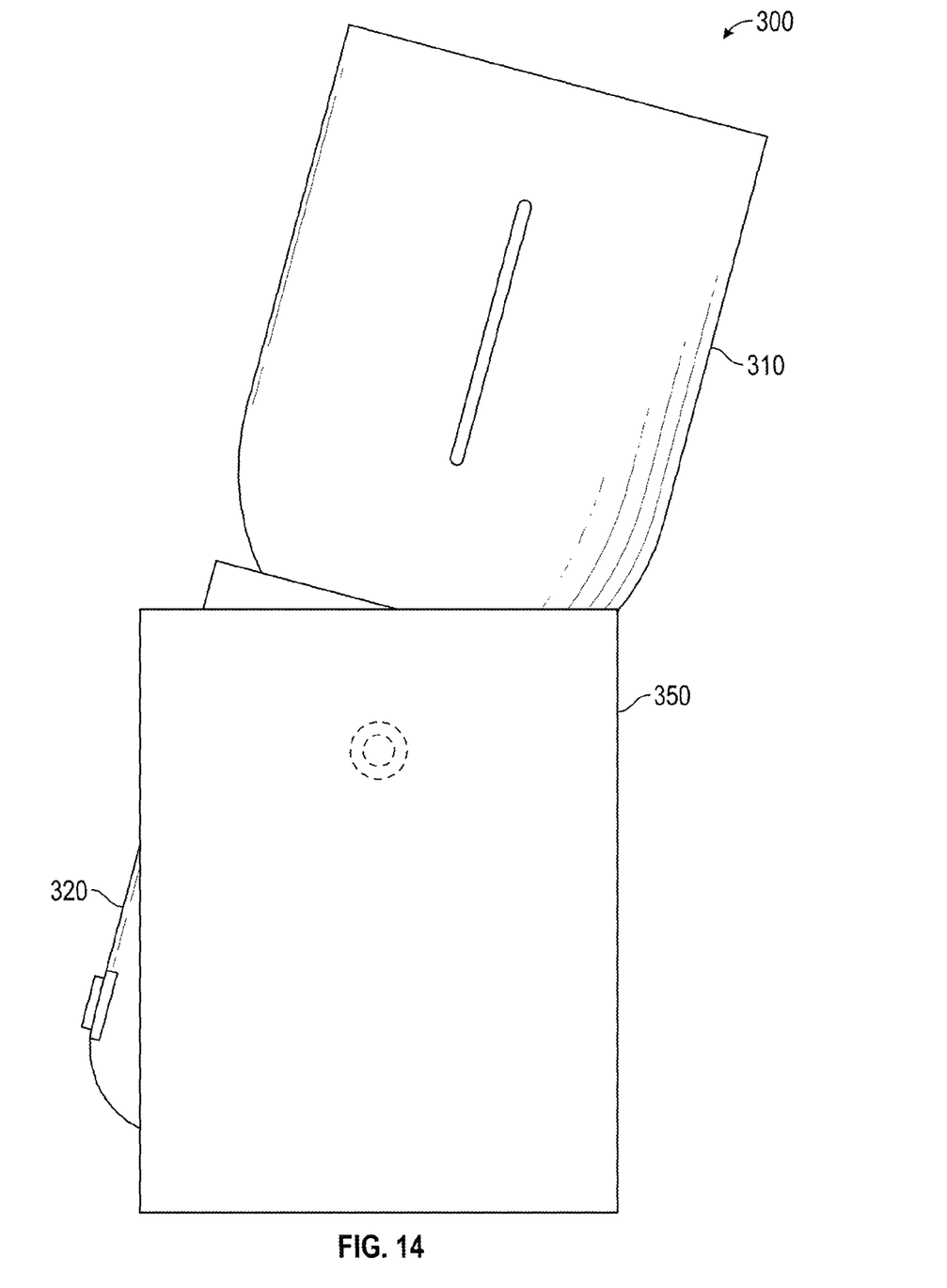
FIG. 14 is a side elevational view of the blender assembly shown in FIG. 10, with the blender and blender motor in a pivoted position.

The degree of pivoting of blender 310 and motor assembly 320 depends on the distance of engagement surface 358 from receivers 362, 364, as well as the height of rear wall 356. A shorter distance between receivers 362, 364 and/or a higher height of rear wall 356 results in less pivot ability, while a greater distance between receivers 362, 364 and/or a lower height of rear wall 356 results in more pivot ability. In an exemplary embodiment, as shown in FIG. 14, blender 310 and motor assembly 320 can pivot between about 20 degrees and about 45 degrees between flange 366 and engagement surface 358.

While blender assemblies 100, 200, 300 are contemplated for use on a countertop for personal or small batch use, those skilled in the art will recognize that blender assemblies 100, 200, 30 can be scaled up in size and mounted on a floor for industrial applications.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A blender assembly comprising:
    a blender motor assembly comprising:
        a housing containing a motor;
        a first extension piece extending outwardly in a plane from the housing;
        a first pivot pin extending outwardly from the housing;
        a second extension piece extending outwardly from a diametrically opposite side of the housing in the plane; and
        a second pivot pin extending outwardly from the housing, co-linear with the first pivot pin;
    a blender container removably attachable to the housing and engageable with the motor;
    a pivot base pivotally supporting the blender motor assembly, the pivot base comprising:
        a base portion located under the housing;
        a first sidewall extending upwardly from the base portion, the first sidewall comprising a first notch, the first notch being formed by a first front stop and a first rear stop, such that the first front stop and the first rear stop form a first angle and such that the first extension piece is located between the first front stop and the first rear stop;
        a first pivot pin hole located at the first notch such that the first pivot pin is inserted into the first pivot pin hole;
        a second sidewall extending upwardly from the base portion, distal from the first sidewall such that the housing is insertable between the first sidewall and the second sidewall, the second sidewall comprising a second notch, the second notch being formed by a second front stop and a second rear stop, such that the second front stop and the second rear stop form a second angle and such that the second extension piece is located between the second front stop and the second rear stop; and
        a second pivot pin hole located at the second notch such that the second pivot pin is inserted into the second pivot pin hole,
    wherein the first extension piece is located in the first notch and the second pivot extension piece is located in the second notch such that the housing is pivotable in a single plane about the first and second pivot pin holes between a first location wherein the first extension piece engages the first front stop and a second position wherein the first extension piece engages the first rear stop.

2. The blender assembly according to claim 1, wherein the first pivot pin extends outwardly from the first extension piece.

3. The blender assembly according to claim 1, wherein the first extension piece comprises a parallelepiped member.

4. The blender assembly according to claim 1, wherein the first angle is about 45 degrees.

5. The blender assembly according to claim 1, wherein the first sidewall extends between the first front stop and the first rear stop.

6. The blender assembly according to claim 1, wherein the blender can pivot no more than about 22.5° from the vertical.

7. The blender assembly according to claim 6, wherein the single plane comprises a front-to-back plane.

8. The blender assembly according to claim 1, wherein the blender assembly is weighted such that, in an unbiased position, the blender assembly extends generally in a vertical position.

9. A blender assembly comprising:
    a blender motor assembly pivotally mounted on a pivot base along only a single plane, the blender motor assembly comprising:
        a housing;
        a first pivot pin extending outwardly from the housing;
        a second pivot pin extending outwardly from the housing, co-axially with the first pivot pin;
        a first extension piece extending outwardly from the housing, co-planar with the first pivot pin;
    the pivot base being bisected by a central longitudinal plane, the pivot base comprising:
        a base portion;
        a first sidewall extending upwardly from the base portion and having a pivot pin hole such that the first pivot pin is inserted into the pivot pin hole, the first sidewall further comprising a notch formed therein, the notch being formed by a front surface and a rear surface and being sized to accept at least part of the first extension piece therein, wherein the first extension piece is pivotable between the front surface and the rear surface, the front surface and the rear surface being separately engageable with the first extension piece to stop the first extension piece; and
        a second sidewall extending upwardly from the base portion, distal from the first side wall, the second sidewall being a mirror image of the first sidewall across the central longitudinal plane;
    wherein the first and second sidewalls form a pivot space therebetween, the pivot space sized to allow the housing to pivot therein, wherein the pivot space is open between the first and second sidewalls.

10. The blender assembly according to claim 9, wherein the pivot pin hole is between the notch and the base portion.

11. The blender assembly according to claim 9, wherein the rear surface extends at an acute angle relative to the front surface.

12. The blender assembly according to claim 9, wherein the first sidewall extends between the front surface and the rear surface.

* * * * *